United States Patent [19]

Middelbeek

[11] 4,123,365
[45] Oct. 31, 1978

[54] OIL-WATER SEPARATOR

[75] Inventor: Cornelis G. Middelbeek, Nootdorp, Netherlands

[73] Assignees: Ballast-Nedam Groep N.V.; Skimovex B.V., both of Nootdorp, Netherlands

[21] Appl. No.: 827,723

[22] Filed: Aug. 25, 1977

Related U.S. Application Data

[63] Continuation of Ser. No. 603,810, Aug. 12, 1975, abandoned.

[30] Foreign Application Priority Data

Aug. 14, 1974 [NL] Netherlands .................. 7410902

[51] Int. Cl.$^2$ ............................................. B01D 21/10
[52] U.S. Cl. ..................................... 210/521; 210/540
[58] Field of Search ............... 210/23 R, 84, 83, 109, 210/110, 205, 207, 257, 306, 513, 519, 521, 522, 532 R, 533, 536, 538, 540, DIG. 5, 320, 335

[56] References Cited

U.S. PATENT DOCUMENTS

| 367,308 | 7/1887 | Macnab et al. ................ 210/521 |
| 801,330 | 10/1905 | Moore ........................ 210/540 |
| 863,168 | 8/1907 | Griswold, Jr. ............... 210/521 X |
| 2,284,737 | 6/1942 | Hirshstein ................... 210/540 X |
| 2,613,811 | 10/1952 | Archibald .................... 210/110 |
| 3,260,368 | 7/1966 | Wagner et al. ............... 210/320 X |
| 3,300,053 | 1/1967 | Peters ........................ 210/540 X |
| 3,346,122 | 10/1967 | Cornelissen ................. 210/540 X |
| 3,529,728 | 9/1970 | Middelbeek et al. ......... 210/540 X |
| 3,933,654 | 1/1976 | Middelbeek .................. 210/521 |
| 4,064,054 | 12/1977 | Anderson et al. ............ 210/DIG. 5 |

FOREIGN PATENT DOCUMENTS

| 2,330,405 | 1/1974 | Fed. Rep. of Germany ......... 210/521 |
| 14,214 | 11/1925 | Netherlands ................... 210/521 |
| 30,162 | 7/1933 | Netherlands ................... 210/536 |
| 88,003 | 4/1958 | Netherlands ................... 210/521 |
| 7,208,503 | 12/1973 | Netherlands ................... 210/521 |
| 308,752 | 8/1929 | United Kingdom .............. 210/521 |
| 1,329,875 | 9/1973 | United Kingdom .............. 210/521 |

Primary Examiner—Richard L. Chiesa
Attorney, Agent, or Firm—Stevens, Davis, Miller & Mosher

[57] ABSTRACT

A separating device for separating substances from a liquid to be purified includes a tank having opposing end walls spaced from each other and a separator, comprising two parallel inclined plates spaced from each other, in the tank. The separating device also includes an inlet in one end wall of the tank for the liquid to be purified, a first outlet in the other end wall of the tank for the purified liquid, and an overflow between the first outlet and the separator. The one end wall of the tank and the one of the two parallel plates closest to the one end wall are spaced throughout their extent from each other and define a space therebetween to substantially eliminate turbulence of the liquid to be purified before entering the separator. The separating device also includes a second outlet from said space for substances to be separated that are lighter than the purified liquid. The second outlet is in the upper end of the one end wall of the tank above the inlet.

2 Claims, 2 Drawing Figures

OIL-WATER SEPARATOR

This is a Continuation of application Ser. No. 603,810 filed Aug. 12, 1975 now abandoned.

The invention relates to a separating device for separating substances from a liquid to be purified, comprising a tank with a separator having at least two parallel inclined plates, spaced from each other, in which the outlet for substances to be separated that are lighter than the purified liquid, such as oil, is located at the upper side of the tank, and an overflow is installed between the outlet of the purified liquid and the separator, with a space between the inlet of the liquid to be purified in the tank near the front wall of the tank and the entrance in the separator, this in order to eliminate turbulence of said liquid before entering into the separator as much as possible, in which the space is bounded by the front wall of the tank and the nearest outer plate of the separator, whereas the other outer plate of the separator is extending practically from the rear wall of the tank. Such a device is known from the Dutch patent application No. 72.08503.

The known device requires some modification and improvement in order to be able to discharge substances that have been separated already from the liquid to be purified or that can be separated quite easily and which are located in said space. In order to achieve this, said space, according to the invention, has at least one outlet for discharging the substances separated from the liquid to be purified.

For the discharge of light substances that can be easily separated from the liquid to be purified before it flows through the separator, a preferred embodiment of the separator according to the invention is characterized in that said space is amply dimensioned, in order to let move upwards in this space the light substances that can be easily separated from the liquid to be purified, such as petrol and petroleum, and to discharge same via the outlet provided near the upper part of the space.

For discharging of the heavier impurities from the liquid to be purified, for instance from the space mentioned or released by passing through the separator or from the overflow, according to another preferred embodiment, the invention is characterized in that said space at the bottom side is connected with a collecting chamber for collecting the substances separated from the liquid to be purified that are heavier than the purified liquid.

In itself it is for instance known from the British Pat. No. 308,752, to provide an outlet in a separator for the separation of impurities from a liquid, and this outlet is then to be provided in the front part of the separator. However, this publication is directed to a separator with an inclining plate and brake plates provided in the inlet part, in such a way that the heavier substances of the liquid in question under the influence of gravity sink to the bottom and can be discharged in this inlet part.

Moreover, it is known from the U.S. Pat. No. 2,613,811, to provide an outlet in the inlet chamber for the discharge of liquid.

This publication is directed to a separator for two liquids, in which the heavy liquid is separated in a separator from the light liquid and all light liquid is discharged through the inlet chamber and all heavier liquid is transmitted further via a drain provided underneath the separator.

The invention will be further explained with reference to the attached drawing.

Figure 1:
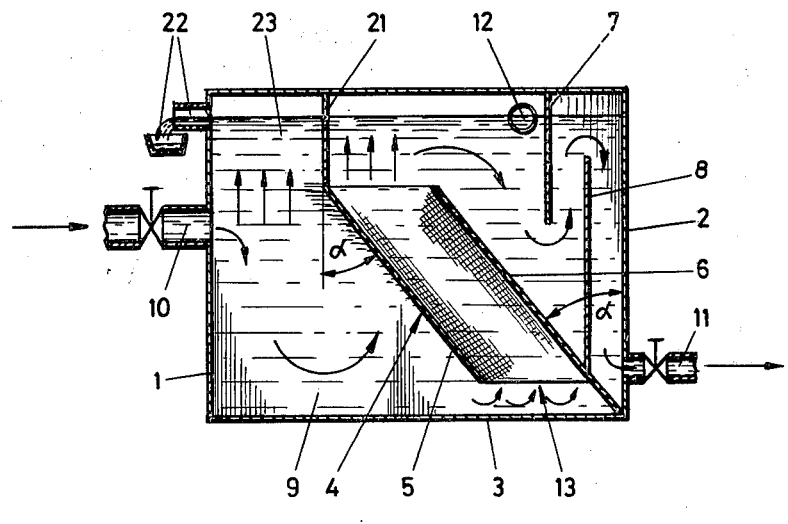
FIG. 1 is a separating device with a coalescing filter.

The separating device according to FIG. 1 consists of a tank with a front wall 1, a rear wall 2 and a bottom 3. In this tank a coalescer or separator 4 is provided with parallel outer plates 5 and 6, of which plate 5 extends from a vertical partition 21 of the tank and forms an angle α with this partition and ends at some distance above the bottom 3. Plate 6 of the separator 4 extends upwardly from the rear wall 2 or (not shown) from the bottom 3 of the tank, close to the wall 2, at the same angle α with the rear wall 2 as plate 5 with partition 21 and terminates at some distance from the upper side of the tank, but above the lower extremity of plate 5.

Between plate 6 of the separator 4 and the wall 2 of the tank there is provided a vertical baffle 7 connected to the side walls of the tank and extending from the upper side of the tank terminating at some distance from the wall 6 of the separator 4. Between this baffle 7 and the wall 2 there is provided a second baffle 8, which extends from plate 6 of the separator 4 and terminates at some distance under the upper side of the tank, but above the lower extremity of baffle 7.

In the space 9 between the front wall 1 of the tank and the partition 21 and plate 5 of the separator 4 opens a supply line 10 for the liquid to be purified, whereas the purified liquid is discharged through line 11, which is in communication with the space bounded by wall 2, plate 6 and baffle 8. To discharge the separated impurities, such as oil, an outlet pipe 12 is provided. It is also possible to apply an adjustable outlet pipe (skimmer). For the discharge of a light liquid fraction 23 from space 9, a discharge 22 is provided in a similar way.

The liquid to be purified enters the device through line 10 and flows through space 9, in which turbulence is eliminated completely or for the greater part and which is amply dimensioned in order to separate light liquids 23, such as petrol and petroleum, and flows at the lower side into the separator 4.

The separation of the impurities that is more difficult, such as oil, gathers at the upper part of the tank and are discharged through pipe 12. The purified liquid flows from the upper side of the separator 4 underneath baffle 7 and over baffle 8, serving as an overflow, to line 11 where it is discharged. Arrows show the paths of the liquids. If desired, dependent on the material to be treated, it is possible to provide a coalescing filter 13 between the plates 5 and 6.

Figure 2:
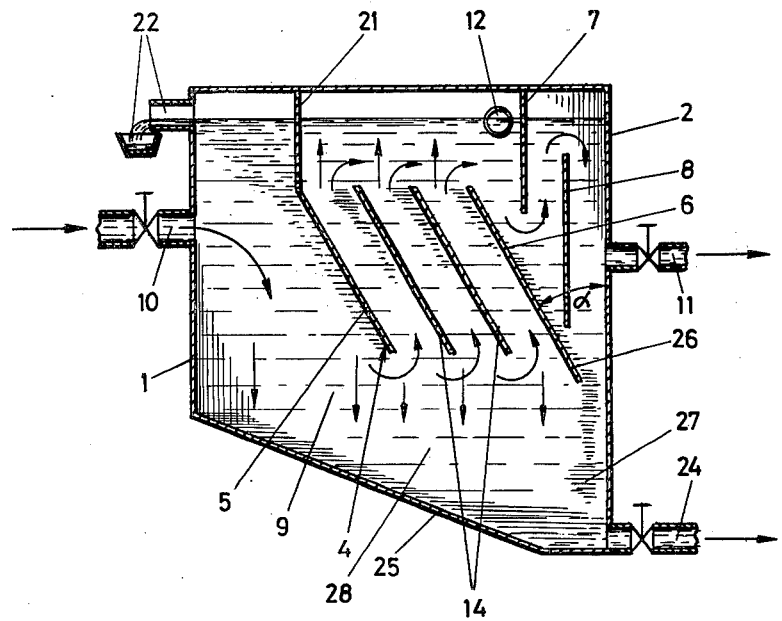
FIG. 2 is a separating device as shown in FIG. 1 with a packet of plates.

In FIG. 2, the parts corresponding to those of FIG. 1 are provided with the same reference numerals. In this figure is indicated that in order to increase the capacity, a packet consisting of spaced parallel plates 14 can be provided between the outer plates 5 and 6 of the separator, in which the number of plates 14 and their mutual distance can be chosen in connection with the required capacity of the oil separating device.

For the discharge of a heavier fraction 27 from both the space 9, from the separator 4 and through the passages 26, and from the space past the separator by means of the overflow 7 and 8, the bottom 25 of the tank is of a recessed construction so that a collecting chamber 28 is formed.

The heavier fraction 27 collected in this collecting chamber 28 can be discharged through outlet 24.

The capacity and the power to separate of the device can be varied by varying the number of plates of the plate packet. In this way it is possible to obtain devices with a capacity that varies for instance between 3 and 35 m³/h.

The packet of plates comprises a number of completely identical parallel standard plates, in this way reducing the cost of manufacture. It is possible, as is known, to provide the walls with fingers or the upper extremities of the individual plates can be flanged or bent such that coalescence of the contaminated liquid drops is stimulated.

The angle α between the outer plates of the oil separator and the front and rear walls of the tank is chosen such that the space required for the oil separator is small, whereas the oil separation is good.

It is self-evident that with separators, in which the very light fraction is missing from the liquid to be purified, but a heavier fraction is present indeed, we can suffice with the separator with one collecting chamber, but without enlarged space 9.

What we claim is:

1. A separating device for separating substances from a liquid to be purified, said separating device comprising:
    a tank having substantially vertical outer walls, a bottom, and a substantially vertical inner wall spaced horizontally from one of said outer walls;
    a separator in said tank, said separator comprising two parallel inclined plates spaced from each other, the one of said plates closest to said one outer wall being connected at its upper end to said vertical inner wall;
    a first outlet in the tank for the purified liquid;
    an overflow between the first outlet and the separator;
    a second outlet above the separator for the separated light substances, said second outlet being between said separator and said overflow;
    an inlet in said one outer wall of said tank for the liquid to be purified;
    said one outer wall of the tank defining with said inner wall and the one of said two parallel plates closest to said one wall a space therebetween to substantially eliminate turbulence of the liquid to be purified before entering the separator, said space including a portion between said one outer wall and said one of said two parallel plates closest thereto of increasing cross-section with increasing depth;
    a third outlet from said space for substances to be separated that are lighter than the purified liquid, said third outlet being from the upper end of the space; and
    the other one of said two parallel plates extends from a region adjacent another outer wall of said tank opposite said one wall.

2. A separating device as claimed in claim 1, wherein said separator further comprises a plurality of additional spaced parallel inclined plates between said two first-mentioned parallel plates.

* * * * *